United States Patent [19]

Walle

[11] 4,294,107
[45] Oct. 13, 1981

[54] SELF-PURGING PROBE FOR LOW PRESSURE LEAK DETECTION

[76] Inventor: L. Irwin Walle, 1537 Greenlea Dr., Clearwater, Fla. 33515

[21] Appl. No.: 150,933

[22] Filed: May 19, 1980

[51] Int. Cl.³ ............................................ G01M 3/32
[52] U.S. Cl. ...................................... 73/49.2; 73/49.8
[58] Field of Search ...................... 73/37, 40, 41–45.4, 73/49.2, 49.3, 49.4, 49.8

[56] References Cited

U.S. PATENT DOCUMENTS

| | | | |
|---|---|---|---|
| 3,390,569 | 7/1968 | McMeekin | 73/49.8 X |
| 3,495,441 | 2/1970 | Laub | 73/45.2 |
| 3,805,594 | 4/1974 | Hayashi | 74/49.2 |
| 3,987,664 | 10/1976 | Hass et al. | 73/49.2 |
| 4,019,370 | 4/1977 | Allocco, Jr. | 73/49.2 X |
| 4,157,656 | 6/1979 | Walle | 73/49.2 |
| 4,172,477 | 10/1979 | Reich | 73/49.2 X |

Primary Examiner—John Petrakes
Attorney, Agent, or Firm—Stanley M. Miller

[57] ABSTRACT

A self-purging fluid pressure adapter is disclosed which is connected between a fluid test pressure source, a fluid pressure gauge, and a fluid container undergoing a pressure test. The adapter rapidly purges fluid pressure from the pressure gauge when the container is disconnected from the adapter so as to quickly prepare the gauge for testing a next container on a conveyor belt. Two embodiments of the adapter are disclosed, the first operating on the jet pump principle and the second operating on the Venturi tube principle. In both embodiments the adapter includes a fluid pressure inlet chamber connected to the fluid test pressure source and a fluid pressure outlet chamber which is selectively connected to either the container under test or to an ambient fluid pressure. A high velocity fluid chamber is connected between the fluid pressure inlet chamber and the fluid pressure outlet chamber, for conducting the testing fluid from the inlet chamber to the outlet chamber at a minimum velocity when the container is connected to the outlet chamber while being tested. The high velocity fluid chamber conducts the testing fluid from the inlet chamber to the outlet chamber at a maximum velocity when the container is disconnected from the outlet chamber. A pressure gauge channel is connected to the fluid pressure gauge and has an orifice opening into the high velocity fluid chamber. The high velocity fluid chamber will have a fluid pressure which is substantially equal to the fluid pressure in the pressure gauge channel when the testing fluid therein has the minimum velocity, during the period when the container is being tested. The high velocity fluid chamber will have a fluid pressure substantially lower than the fluid pressure in the gauge channel when the testing fluid therein has the maximum velocity at the time when the container is disconnected after the test. In this manner, fluid pressure is rapidly purged from the pressure gauge when the container is disconnected, in preparation for the pressure testing of a next container on an assembly line.

7 Claims, 4 Drawing Figures

PRESSURE TESTING SYSTEM

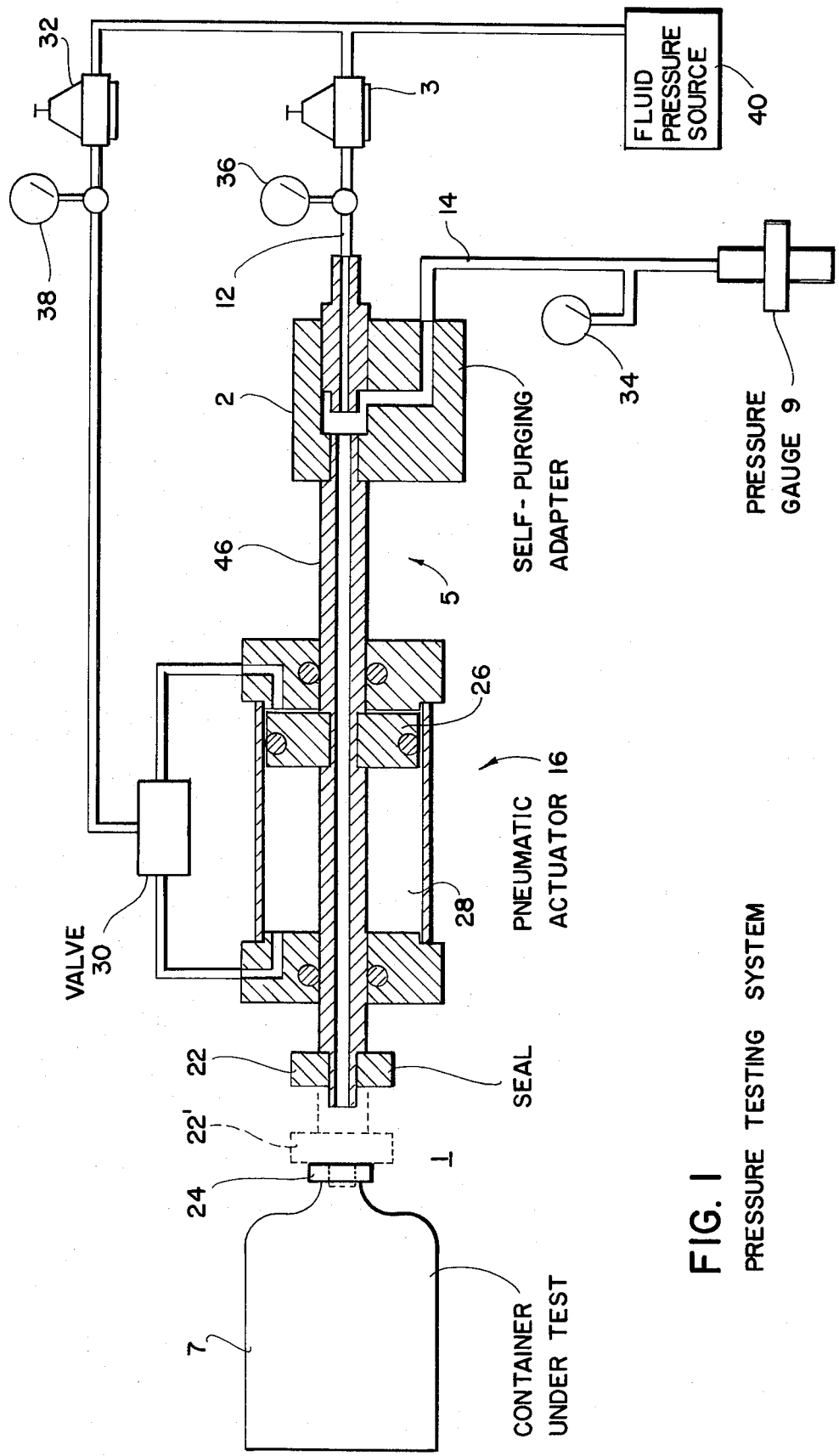
FIG. 1 PRESSURE TESTING SYSTEM

FIG. 2b SEC. 2b-2b'
SELF-PURGING ADAPTER
JET PUMP PRINCIPLE
FIG. 2a
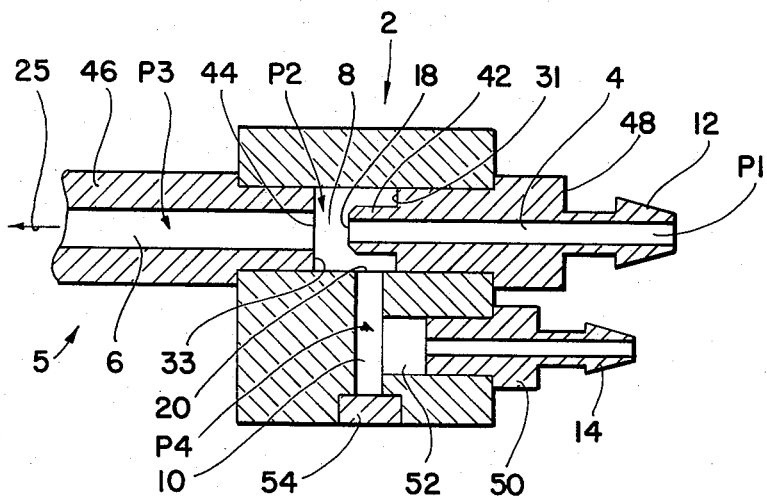
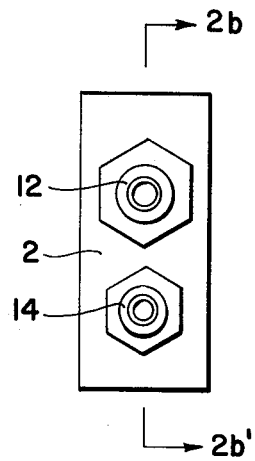
FIG. 3
SELF-PURGING ADAPTER
VENTURI TUBE PRINCIPLE
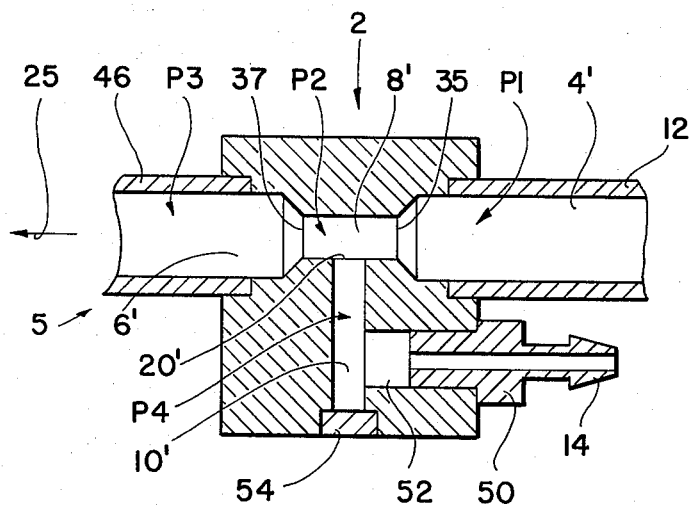

SELF-PURGING PROBE FOR LOW PRESSURE LEAK DETECTION

FIELD OF THE INVENTION

The invention disclosed broadly relates to measurement apparatus and more particularly relates to automatic leak detection and pressure testing apparatus.

BACKGROUND OF THE INVENTION

The increasing demand for plastic containers, plus the increasing cost of materials, has encouraged the production of containers having a very thin wall thickness. These containers are extremely practical from the utility aspect, but present some problems in manufacture. A major problem in the manufacture of thin wall containers is occasioned by the introduction of foreign matter into the raw material. The smallest particle of such foreign matter will cause a perforation in the wall of a container, and therefore permit the leakage of any fluid product from the container. As the manufacture of plastic containers incorporates the removal of excess plastic (flashing) after the container is molded, and the recycling of the excess plastic, it is virtually impossible to assure that absolutely no foreign matter ever contaminates the raw material stock. This results in an occasional container being manufactured which has a perforated wall, but which, in all other aspects, appears to be an acceptable product. It is therefore imperative that all containers are checked for such conditions before subsequent processing.

Depending on the size of the container, and the equipment used for production, containers may be produced at speeds ranging from 5 to 120 parts per minute. It would be impractical, even at the slowest production rate, to inspect the containers by manual methods. The inspection must be an automatic function. One method of inspecting containers for leakage is to inject air under pressure into the container by a sealing type of probe or closure, such as is disclosed in U.S. Pat. No. 3,495,441 to Laub. The pressure is required to reach a prescribed level and, in some cases, to hold that pressure for a period of time. In either case, the attainment of the pressure is established by a pressure sensor, and the actuation of a valve or switch.

Thin wall containers are designed to carry food or non-toxic products, and not to withstand pressures in excess of those caused by the product weight. The pressure which can be used for leak detection is therefore limited, in most cases being confined to a few inches of water column. The differential in such pressures caused by leakage are minute, often not exceeding 0.2 inches of water column, and a pressure sensor which will respond to such pressure differentials is necessarily an extremely sensitive instrument. An excellent example of pressure sensing apparatus for testing such containers is disclosed in U.S. Pat. No. 4,157,656 to Walle.

However, one problem which remains in the testing of such containers is that the sensor can still be susceptible to any variations in pressure which occur in the test system, but which may not be part of the test procedure. Although variations in the test pressure can be held to a minimum by carefully controlling the initial pressure supply, this has little effect on the residual pressure factor, which is the pressure left in the system (not exhausted) between tests. At low pressures the rate of pressure decay is comparatively slow, and at fast production rates, the system can become pre-loaded with pressure before the test is initiated, requiring constant adjustment of the initial pressure. Compensating for residual air pressure in a system actually incorporates such pressure as part of the test. Therefore, any variable which permits a longer or shorter exhaust time, such as a change in conveyor speed or blank spaces on the conveyor, will negate the test until the residual pressure is reinstated, or until the system has been readjusted. This entails constant attention to the leak detection system, the rejection of many acceptable containers, and the acceptance of "leakers".

OBJECTS OF THE INVENTION

It is therefore an object of the invention to provide an improved pressure test for thin wall containers.

It is another object of the invention to provide an improved means for compensating for residual air pressure in a thin wall container testing system.

It is still another object of the invention to provide a means for purging the connection between a thin wall container under test and the pressure sensor, between each test.

SUMMARY OF THE INVENTION

These and other objects, features, and advantages of the invention are accomplished by the apparatus disclosed herein. A self-purging fluid pressure adapter is disclosed which is connected between a fluid test pressure source, a fluid pressure range, and a fluid container undergoing a pressure test. The adapter rapidly purges fluid pressure from the pressure gauge when the container is disconnected from the adapter so as to quickly prepare the gauge for testing a next container on a conveyor belt. Two embodiments of the adapter are disclosed, the first operating on the jet pump principle and the second operating on the Venturi tube principle. In both embodiments the adapter includes a fluid pressure inlet chamber connected to the fluid test pressure source and a fluid pressure outlet chamber which is selectively connected to either the container under test or to an ambient fluid pressure. A high velocity fluid chamber is connected between the fluid pressure inlet chamber and the fluid pressure outlet chamber, for conducting the testing fluid from the inlet chamber to the outlet chamber at a minimum velocity when the container is connected to the outlet chamber while being tested. The high velocity fluid chamber conducts the testing fluid from the inlet chamber to the outlet chamber at a maximum velocity when the container is disconnected from the outlet chamber. A pressure gauge channel is connected to the fluid pressure gauge and has an orifice opening into the high velocity fluid chamber. The high velocity fluid chamber will have a fluid pressure which is substantially equal to the fluid pressure in the pressure gauge channel when the testing fluid therein has the minimum velocity, during the period when the container is being tested. The high velocity fluid chamber will have a fluid pressure substantially lower than the fluid pressure in the gauge channel when the testing fluid therein has the maxmimum velocity at the time when the container is disconnected after the test. In this manner, fluid pressure is rapidly purged from the pressure gauge when the container is disconnected, in preparation for the pressure testing of a next container on an assembly line. The resultant apparatus purges the connected between the container under test and the pressure sensor between each test so as to compensate for residual fluid pressure in the system, thereby increasing the accuracy of the pressure testing at fast container production rates.

DESCRIPTION OF THE FIGURES

These and other objects, features, and advantages of the invention will be more fully appreciated with reference to the accompanying figures.

FIG. 1 is an overall schematic diagram of the thin wall container pressure testing system.

FIG. 2a is an end view of the self-purging fluid pressure adapter invention employing the jet pump principle.

FIG. 2b is a side cross sectional view taken along the section line 2b—2b' of FIG. 2a.

FIG. 3 illustrates an alternate embodiment of the self-purging fluid pressure adapter invention employing the Venturi tube principle.

DISCUSSION OF THE PREFERRED EMBODIMENT

In order to overcome the problem of compensating for residual air pressure which is not exhausted between pressure tests, it is necessary to purge the connection between the container under test and the pressure sensor between each test, so that each successive test starts from a zero gauge pressure and is exactly the same for each container regardless of the interval between the tests. The invention disclosed herein achieves this by employing high velocity fluid chamber which is connected between the pressure source, the pressure gauge, and the fluid container, so that by operation of Bernoulli's principle of hydrodynamics, when a container is disconnected from the testing system, the test fluid will pass by an orifice connected to the pressure gauge at a maximum velocity, thereby substantially lowering the fluid pressure at that orifice to a value less than the fluid pressure in the connection to the pressure gauge, thereby purging the gauge prior to the commencement of the testing of the next container.

FIG. 1 illustrates a system block diagram of the test system which employs the fluid pressure purging adapter 2. The fluid pressure purging adapter 2 is connected between a fluid test pressure source 40, a fluid pressure gauge 9 and a fluid container 7 which is undergoing a pressure test. The fluid test pressure source 40 can be a main air supply which is connected through the regulator 3 and the gauge 36 to the input line 12 to the fluid pressure purging adapter 2, which is shown in greater detail in its preferred embodiment employing the jet pump principle, in FIG. 2a and FIG. 2b. The fluid pressure gauge 9 is connected to a test pressure gauge 34 and is connected by means of the line 14 to the fluid pressure purging adapter 2. A specific example of the fluid pressure gauge or sensor 9 is shown in U.S. Pat. No. 4,157,656 to L. I. Walle, the disclosure of which is incorporated herein by reference.

The pressure testing system shown in FIG. 1 is designed to operate in cooperation with an indexing conveyor upon which is transported a series of finished, thin wall containers which must be pressure tested. The pressure gauge 9 will be connected to an adjacent push-off mechanism which will select either good or rejected containers in response to a given container having passed or failed a pressure test. A container under test 7 will be positioned on the conveyor belt so that its mouth 24 is juxtaposed with the seal 22 mounted on the pipe 46, generally referred to as the apparatus 5 in FIG. 1.

The pipe 46 is mounted, in turn to a piston 26 which is driven longitudinally in a pneumatic cylinder 28, generally referred to as the apparatus 16 in FIG. 1. A driving fluid such as air, is selectively applied on either side of the piston 26 by means of the valve 30 so that the seal 22 can sealably engage the mouth 24 at the position 22' shown in FIG. 1, thereby conducting the test fluid from the supply 40 through the line 12 and the adapter 2, through the pipe 46 and into the container under test 7. The air supply for powering the pneumatic actuator 16 can be from the main air supply 40 through the pressure regulator 32 to the valve 30. The pressure gauge 38 connected to the outlet side of the regulator 32 enables the monitoring of the pressure to the pneumatic actuator. An example of a pneumatic actuator 16 in this application is disclosed in the article by L. I. Walle, "Air Jet Sensors Speed Product Testing And Inspection", *Hydraulics and Pneumatics*, Nov. 1975, pp. 75-77. Another illustration of a pneumatic actuator such as that disclosed at 16 in FIG. 1, is in U.S. Pat. No. 3,495,441 by H. Laub.

In operation, the fluid pressure purging adapter 2, shown in detail in FIGS. 2a and 2b, rapidly purges fluid pressure from the pressure gauge 9 and the pressure line 14 when the container 7 has its mouth 24 disconnected from the seal 22 as it is withdrawn by the pneumatic actuator 16. The fluid pressure purging adapter 2 includes a fluid pressure inlet chamber 4, having an approximate diameter of 0.150 inches for example, wherein the fluid pressure is P1 and the fluid velocity is V1, connected to the fluid test pressure source 3. The fluid pressure purging adapter 2 further includes the fluid pressure outlet chamber 6, having an approximate diameter of 0.250 inches for example, wherein the fluid pressure is P3, which is selectively connected by virtue of the operation of the pneumatic actuator 16, to either the mouth 24 of the container 7 under test or to the ambient 1 having a fluid pressure Pa which is less than the fluid pressure P1 in the inlet chamber.

The fluid pressure purging adapter 2 further includes a high velocity fluid chamber 8, having an approximate diameter of 0.500 inches for example, wherein the fluid pressure is P2 and the fluid velocity V2. The high velocity fluid chamber 8 is connected between the fluid pressure inlet chamber 4 and the fluid pressure outlet chamber 6. The high velocity fluid chamber 8 conducts the testing fluid 25 from the inlet chamber 4 to the outlet chamber 6 at a minimum velocity Vmin which is approximately equal to zero, when the container 7 is connected by the seal 22' in FIG. 1, to the outlet chamber 6. The high velocity fluid chamber 8 conducts the testing fluid 25 from the inlet chamber 4 to the outlet chamber 6 at a maximum velocity Vmax when the container 7 is disconnected from the seal 22 so that the outlet chamber 6 is connected to the ambient 1.

The fluid pressure purging adapter 2 further includes a pressure gauge channel 10 and 52 which is connected by means of the connection 14 to the fluid pressure gauge 9. The pressure gauge channel 10 has an orifice 20, having a diameter of approximately 0.200 inches for example, opening into the high velocity fluid chamber 8. The high velocity fluid chamber 8 will have a fluid pressure P2 which is substantially equal to the fluid pressure P4 in the pressure gauge channel 10 when the testing fluid 25 in the high velocity fluid chamber 8 has the minimum velocity Vmin of approximately zero. This is easily seen from Bernoulli's equation $P1 + (\frac{1}{2})d(V1)^2 = P2 + (\frac{1}{2})d(V2)^2$ where d is the density of the testing fluid. During the period when the container 7 is under test, V1 and V2 are approximately zero and therefore P1=P2 and indeed, P1=P2=P3=P4, as shown in FIG. 2b. When the container 7 is disconnected from the fluid pressure purging adapter 2, the high velocity fluid chamber 8 shown in FIG. 2b, operates on the jet pump principle causing the fluid pressure P2 to be substantially lower than the fluid pressure P4 in the pressure gauge channel 10 because the testing fluid 25 in the high velocity fluid chamber 8 has achieved a maximum velocity Vmax. This is shown by Bernoulli's equation since the velocity of the test fluid passing from the fluid pressure inlet chamber 4 across the high velocity fluid chamber 8 to the fluid pressure outlet chamber 6 has a value Vmax whereas the velocity of the test fluid at the orifice 20 of the pressure gauge channel 10 is approximately zero. At the instant when the container 7 is disconnected from the fluid pressure purging adapter 2, the initial fluid pressure P4 in the pressure gauge channel 10 is approximately equal to the pressure P1 which existed during the period of container testing. However, the pressure in the high velocity fluid chamber 8 will be $P2=P1-(\frac{1}{2})d(Vmax)^2$. Since the fluid pressure P4 in the pressure gauge channel 10 is substantially greater than the fluid pressure P2 in the high velocity fluid chamber 8 when the container 7 is disconnected from the adapter 2, the fluid pressure P4 in the pressure gauge 9 and in the line 14 will be rapidly purged. This will assure that each consecutive pressure test starts from a zero gauge pressure and that the test is exactly the same for each container regardless of the interval between tests.

The more detailed view of the first embodiment of fluid pressure purging adapter 2 employing the jet pump principle shown in FIG. 2b, shows that the high velocity fluid chamber 8 has its peripheral inner surface formed as a hollow cylinder with its cylindrical axis parallel with the principal flow direction 25 of the test fluid. The inlet chamber 4 is coaxially connected at a first end 31 with the high velocity fluid chamber 8 by means of the hollow connector 48. The outlet chamber 8 is coaxially connected via an outlet port 44 in the tube 46 to the high velocity chamber 8 at the second end 33 thereof, which is separated by approximately 0.550 inches from the first end 31 for example.

The orifice 20 of the pressure gauge channel 10 opens onto the peripheral inner surface of the hollow cylinder 8 at a position proximate to the first end 31 thereof, which is approximately 0.275 inches from the second end 33 for example.

A hollow nipple 42 is mounted coaxially on the connector 48 at the first end 31 of the hollow cylinder 8 and projects toward the second end 33 thereof with a separation distance of approximately 0.250 inches from the second end 33 for example. The hollow nipple 42 has a high velocity fluid orifice 18 which opens into the hollow chamber 8 and is coaxial with and proximate to the outlet port 44. The maximum velocity Vmax of the testing fluid passing from the inlet chamber 4 to the outlet chamber 6 imparts the substantially lower fluid velocity $P2=P1-(\frac{1}{2})d(Vmax)^2$, to the hollow cylinder 8 and to the pressure gauge channel orifice 20, as was discussed above.

The testing fluid employed with the fluid pressure purging adapter 2 may be either a gas such as air or nitrogen or it may be a liquid such as water.

In fabricating fluid pressure purging adapter 2 of FIG. 2b, it can be formed out of a block of metal into which three circular holes are machined, a first hole into which may be inserted the tube 46 and the connector 48, a second hole 52 into which may be inserted the connector 50 on which is mounted the line 14, and a third hole forming the pressure gauge channel 10. The pressure gauge channel 10 may be blocked by the plug 54, as is shown in FIG. 2b.

The second embodiment of the invention employing the Venturi tube principle, is shown in FIG. 3 wherein the fluid pressure purging adapter 2 has a fluid pressure inlet chamber 4' which is a first hollow cylindrical chamber having a first diameter D1 of approximately 0.500 inches for example, with a cylindrical axis parallel with the principal flow direction 25 of the test fluid. The fluid pressure inlet chamber 4' is connected to the pressure line 12.

The second embodiment of the fluid pressure purging adapter 2 further includes a high velocity fluid chamber 8' which is a second hollow cylindrical chamber coaxial with the first chamber 4' and is connected therewith at a first end 35 and is connected to an outlet chamber 6' at a second end 37 thereof. The outlet chamber 6' is connected in turn to the tube 46. The high velocity fluid chamber 8' has a second diameter D2 of approximately 0.250 inches for example, which is less than D1.

A pressure gauge channel 10' has an orifice 20' which opens onto the cylindrical surface of the second hollow cylindrical chamber 8'.

The testing fluid 25 passes from the inlet chamber 4' to the outlet chamber 6' and increases its velocity from a velocity V1 in the inlet chamber 4' of diameter D1, to a velocity V2 in the high velocity fluid chamber 8' of diameter D2 less than D1, in accordance with the Venturi action dictated by Bernoulli's equation. If P1 and V1 are the pressure and velocity of the fluid in the inlet chamber 4' and if P2 and V2 are the pressure and velocity of the fluid in the high velocity fluid chamber 8', then $P1+(\frac{1}{2})d(V1)^2=P2+(\frac{1}{2})d(V2)^2$. Since V2 in the high velocity fluid chamber 8' is greater than V1 in the inlet chamber 4', then P2 is less than P1 and thus the high velocity of the fluid passing through the high velocity fluid chamber 8' will impart a substantially lower fluid pressure P2 to the pressure gauge channel orifice 20' when the container 7 is disconnected from the fluid pressure purging adapter 2. Since the pressure P4 in the pressure gauge channel 10' is approximately equal to the original higher value of the pressure P1 at the instant the container 7 is disconnected, fluid pressure will be purged from the pressure gauge 9 between each test and this assures that each test starts from zero gauge pressure and the test is exactly the same for each container regardless of the interval between tests. In this second embodiment, the testing fluid may be either a gas or a liquid.

Thus it is seen that the fluid pressure purging adapter disclosed herein automatically purges the connection to the pressure gauge between each test. This assures that each test starts from zero gauge pressure and that the test is exactly the same for each container regardless of the interval between the tests. Test fluid is drawn from the connector tube and pressure gauge whenever a free flow of test fluid occurs across the high velocity fluid chamber 8 in the fluid pressure purging adapter 2. The unit will operate by simply switching on the test fluid flow before the probe 22 seals against the mouth 24 of the container 7. Free flow occurs at this point and the back pressure in the tube 14 and the gauge 9 is purged before the container is sealed and after the container is unsealed prior to the sealing of the next consecutive container. The action based upon Bernoulli's principle insures that a zero gauge pressure condition is achieved before each container testing period.

Although specific embodiments of the invention have been disclosed, it will be understood by those of skill in the art that changes can be made in the dimensions and the materials disclosed without departing from the spirit and the scope of the invention.

What is claimed is:

1. A fluid pressure purging adapter connected between a fluid test pressure source, a fluid pressure gauge and a fluid container undergoing a pressure test, for rapidly purging fluid pressure from said pressure gauge when said container is disconnected from the adapter, comprising:

a fluid pressure inlet chamber connected to said fluid test pressure source;

a fluid pressure outlet chamber selectively connected to either said container under test or to an ambient fluid pressure;

a high velocity fluid chamber connected between said fluid pressure inlet chamber and said fluid pressure outlet chamber, for conducting the testing fluid from said inlet chamber to said outlet chamber at a minimum velocity when said container is connected to said outlet chamber and for conducting the testing fluid from said inlet chamber to said outlet chamber at a maximum velocity when said container is disconnected from said outlet chamber;

a pressure gauge channel connected to said fluid pressure gauge, having an orifice opening into said high velocity fluid chamber;

said high velocity fluid chamber having a fluid pressure substantially equal to the fluid pressure in said pressure gauge channel when said testing fluid therein has said minimum velocity and said high velocity fluid chamber having a fluid pressure substantially lower than the fluid pressure in said pressure gauge channel when said testing fluid therein has said maximum velocity;

whereby said fluid pressure is rapidly purged from said pressure gauge when said container is disconnected.

2. The apparatus of claim 1, which further comprises:

said high velocity fluid chamber having its peripheral inner surface formed as a hollow cylinder with its cylindrical axis parallel with the principal flow direction of said test fluid with said inlet chamber coaxially connected at a first end thereof and said outlet chamber coaxially connected via an outlet port at the second end thereof;

said orifice of said pressure gauge channel opening onto said peripheral inner surface of said hollow cylinder proximate to said first end thereof;

a hollow nipple mounted coaxially on said first end of said hollow cylinder and projecting toward said second end thereof, having a high velocity fluid orifice opening into said hollow chamber coaxial with and proximate to said outlet port;

said maximum velocity testing fluid passing from said inlet chamber to said outlet chamber imparting said substantially lower fluid pressure to said hollow cylinder and said pressure gauge channel orifice.

3. The apparatus of claim 2, wherein said testing fluid is a gas.

4. The apparatus of claim 2, wherein said testing fluid is a liquid.

5. The apparatus of claim 1, which further comprises:

said fluid pressure inlet chamber being a first hollow cylindrical chamber having a first diameter, with a cylindrical axis parallel with the principal flow direction of said test fluid;

said high velocity fluid chamber being a second hollow cylindrical chamber coaxial with said first chamber and connected therewith at a first end and connected to said outlet chamber at the second end thereof;

said orifice of said pressure gauge channel opening onto the cylindrical surface of said second hollow cylindrical chamber;

said testing fluid passing from said inlet chamber to said outlet chamber increasing its velocity to said maximum velocity by the Venturi action of said first and second hollow cylinders and imparting said substantially lower fluid pressure to said pressure gauge channel orifice.

6. The apparatus of claim 5, wherein said testing fluid is a gas.

7. The apparatus of claim 5, wherein said testing fluid is a liquid.

* * * * *